S. F. CARRICO & S. GERICKE.
NUT LOCK.
APPLICATION FILED JUNE 23, 1914.
1,128,104.
Patented Feb. 9, 1915.
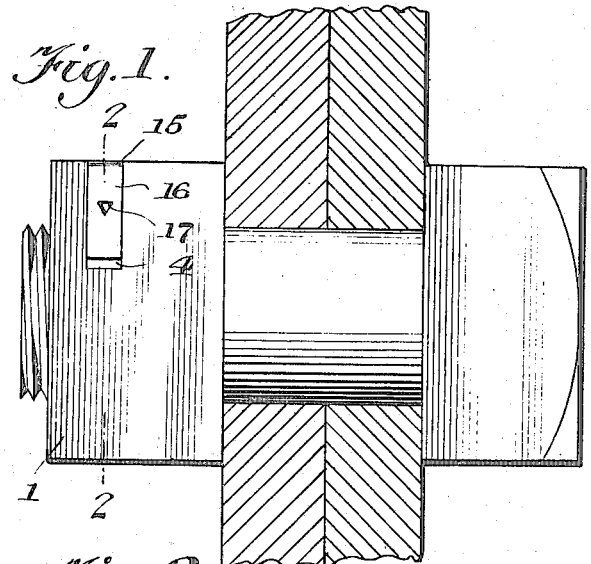
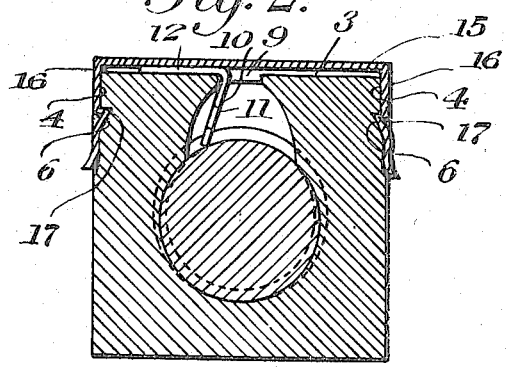
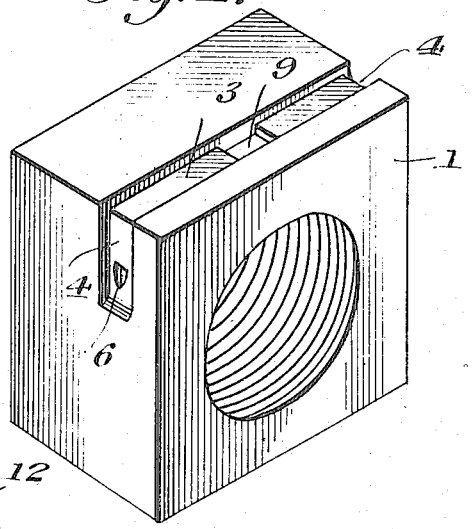
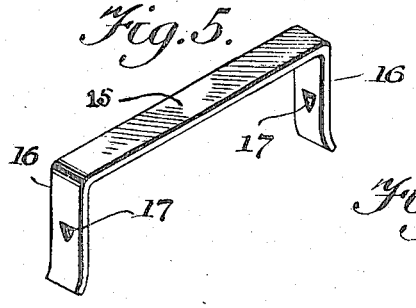
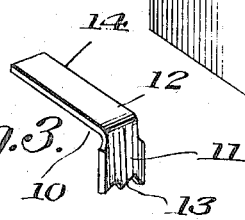
Witnesses
F. H. Shallenberger
Inventors
S. F. Carrico
S. Gericke
By Victor J. Evans
Attorney

UNITED STATES PATENT OFFICE.

SAMUEL F. CARRICO AND SAMUEL GERICKE, OF SOUTH GREENFIELD, MISSOURI.

NUT-LOCK.

1,128,104.     Specification of Letters Patent.     Patented Feb. 9, 1915.

Application filed June 23, 1914. Serial No. 846,832.

*To all whom it may concern:*

Be it known that we, SAMUEL F. CARRICO and SAMUEL GERICKE, citizens of the United States, residing at South Greenfield, in the county of Dade and State of Missouri, have invented new and useful Improvements in Nut-Locks, of which the following is a specification.

The present invention relates to means for locking a nut upon a bolt, and permitting the separation of the nut from the bolt when desired.

In carrying out our invention we propose to provide a nut with a spring locking member or dog which engages with the threads of the bolt and which is retained in position by a detachable member which can readily be removed from the nut to disengage the dog from the threads of the bolt to permit of the separation of the nut and bolt.

With the above and other objects in view, the improvement resides in the construction, combination and arrangement of parts set forth in the following specification and falling within the scope of the appended claim.

In the drawing: Figure 1 is a view illustrating the application of our improvement, Fig. 2 is a transverse sectional view on the line 2 2 of Fig. 1, Fig. 3 is a detail perspective view of the dog, Fig. 4 is a similar view of the nut, and Fig. 5 is a similar view of the locking or retaining member for the dog.

Referring now to the drawing in detail, the numeral 1 designates a nut which is threaded upon a bolt, both the nut and bolt being of the ordinary construction. The nut 1, in the showing of the drawing, is square or rectangular and has one of its outer faces provided with a longitudinal depression or slot 3 which communicates with similar depressions or slots 4 in the sides or in the opposite faces of the nut. The side slots 4 are provided with indentures or depressions 6, while the longitudinal slot 3 communicates with a central opening 9 that is preferably rectangular and which in turn communicates with an enlarged depression formed adjacent the bore of the nut.

The numeral 10 designates the dog. This dog comprises a spring member of an equal thickness throughout, and which includes a head 11 and a right angular tail 12. The head 11 has its lower edge formed with teeth 13, and the tongue 14 is of a size sufficient to pass through the longitudinal channel in the nut, so that the said tail will rest within the channel and the toothed end of the head will be disposed slightly beyond the threads in the bore of the nut.

The numeral 15 designates a substantially U-shaped bail which is adapted to have its body portion arranged within the longitudinal channel of the nut to overlie the tail of the dog and its side arms 16 are provided with inwardly extending lugs 17 which are adapted to engage within the indentures in the side channels of the nut. The yoke is, of course, constructed of spring metal, as is also the dog, and it will be noted that when the nut is screwed upon the bolt, the resilient head of the dog will yield in one direction, that is when the nut is being screwed home upon the bolt, but the teeth of the dog will engage with the threads of the bolt to retard the same from an opposite or unscrewing direction.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what we claim is:

In combination with a bolt and a nut therefor, the said nut having one of its outer faces channeled longitudinally and the sides formed with channels which communicate with the said longitudinal channels, the side channels having their inner walls formed with indentures, the longitudinal channel having its lower wall centrally provided with an opening which communicates with the bore of the nut, a substantially L-shaped spring dog having an enlarged head, the edge of which is formed with teeth arranged within the bore of the nut and a tail which extends through the opening and is arranged within the longitudinal channel of the nut, and a substantially U-shaped spring member having its side arms provided with lugs adapted to engage within the indentures in the side channels of the nut and its body portion overlying and frictionally contacting with the tail of the dog.

In testimony whereof we affix our signatures in presence of two witnesses.

SAM. F. CARRICO.
SAM. GERICKE.

Witnesses:
A. M. PATTON,
GEO. WENISTEOR.